N. G. HANNA.
BUNCHER ATTACHMENT FOR MOWING MACHINES.
APPLICATION FILED DEC. 6, 1906.
924,775.
Patented June 15, 1909.
4 SHEETS—SHEET 2.
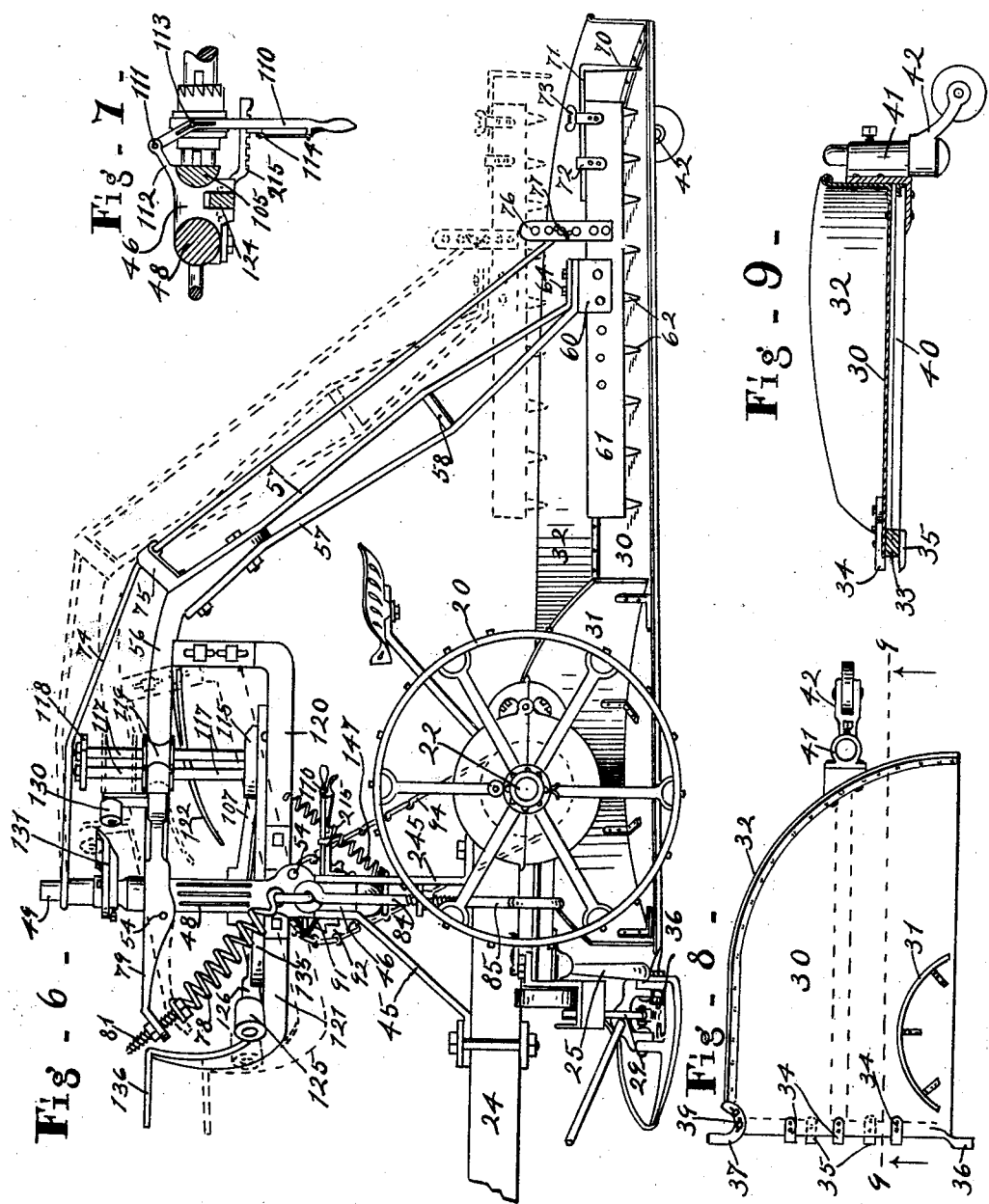
WITNESSES:
INVENTOR.
Nelson G. Hanna.
BY
Lockwood
ATTORNEY.

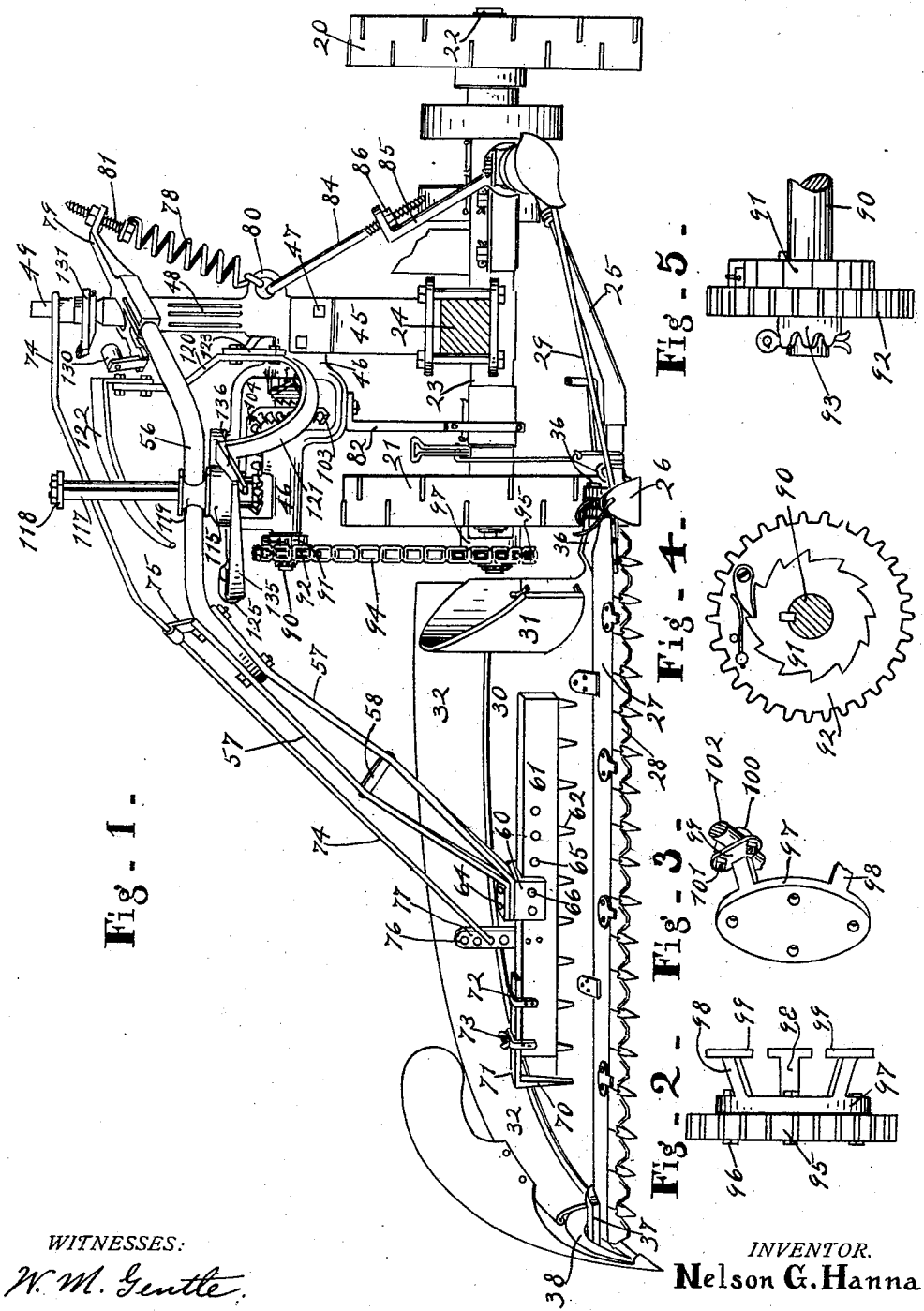

N. G. HANNA.
BUNCHER ATTACHMENT FOR MOWING MACHINES.
APPLICATION FILED DEC. 6, 1906.
924,775.
Patented June 15, 1909.
4 SHEETS—SHEET 3.
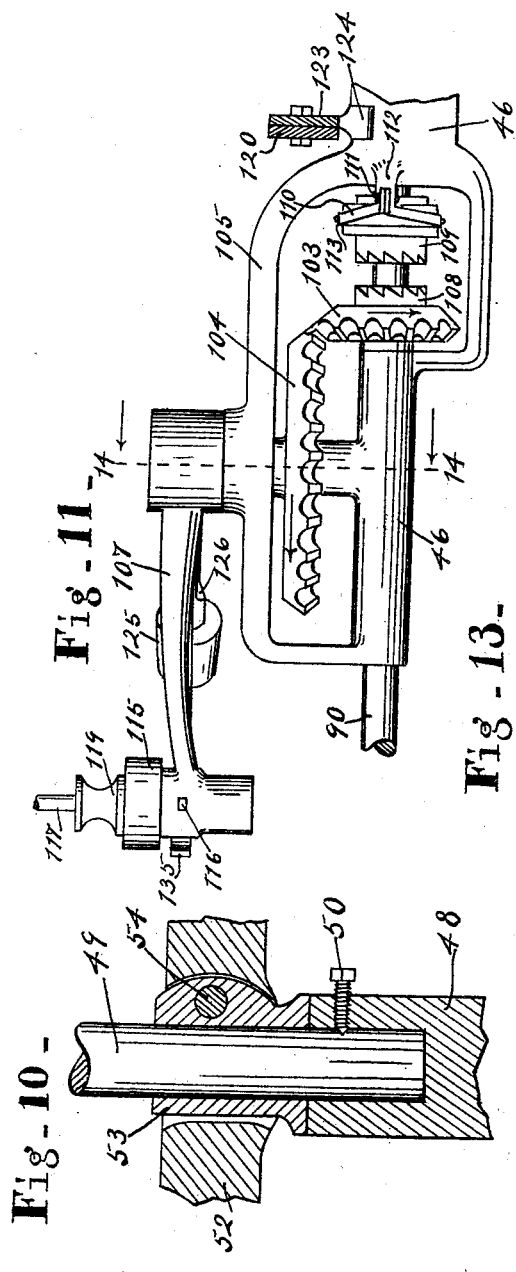
WITNESSES:
W. M. Gentle.
N. Allemong.
INVENTOR.
Nelson G. Hanna.
BY
W. H. Lockwood
ATTORNEY.

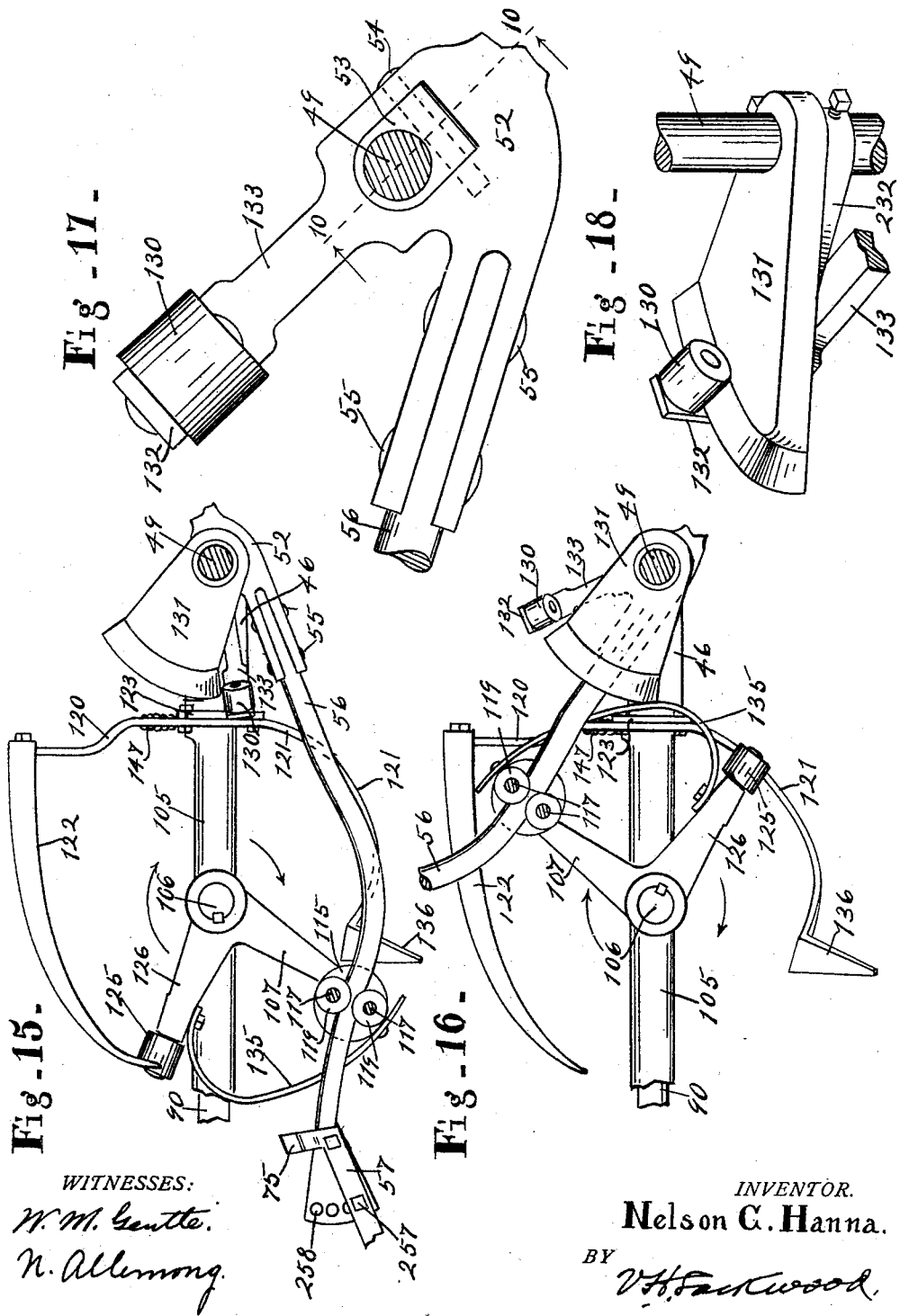

UNITED STATES PATENT OFFICE.

NELSON G. HANNA, OF KOKOMO, INDIANA, ASSIGNOR TO KOKOMO BUNCHER COMPANY, OF KOKOMO, INDIANA, A CORPORATION OF INDIANA.

BUNCHER ATTACHMENT FOR MOWING-MACHINES.

No. 924,775.   Specification of Letters Patent.   Patented June 15, 1909.

Application filed December 6, 1906. Serial No. 346,633.

*To all whom it may concern:*

Be it known that I, NELSON G. HANNA, of Kokomo, county of Howard, and State of Indiana, have invented a certain new and useful Improvement in Buncher Attachments for Mowing-Machines; and I do hereby declare that the following is a full, clear, and exact description thereof, reference being had to the accompanying drawings, in which like numerals refer to like parts.

The object of this invention is to improve the construction of mowing machines that are provided with self raking mechanism for bunching clover, peas, flax and the like.

The purpose of the construction is to bunch material and deposit it to the side out of the subsequent path of the horses and machine.

The nature of the invention and the parts considered to be new will be more fully understood from the accompanying drawings and the following description and claims.

In the drawings, Figure 1 is a front elevation of the machine with the tongue partly cut away. Fig. 2 is a front elevation of the driving pinion and the means for securing it in place at the end of the main driving shaft. Fig. 3 is a perspective view of a part of the means for fastening said pinion to the driving wheel, a part of one spoke and said wheel being shown. Fig. 4 is a side elevation of the driven pinion, the driven shaft being in section. Fig. 5 is a plan view of the same. Fig. 6 is a side elevation of the machine, the position of the parts when the rake has risen being shown by dotted lines. Fig. 7 is a detail of the clutch mechanism for throwing the machine in and out of gear, parts being in horizontal section. Fig. 8 is a plan view of the platform, with a brace on the underside being shown in dotted lines. Fig. 9 is a section of the platform on the line 9—9 of Fig. 8. Fig. 10 is an elevation of the lower part of the fulcrum post for the rake bar and a vertical section through the means in which said post is mounted and the adjacent part of the rake bar, parts being broken away. Fig. 11 is a side elevation of the rake actuating arm and means for carrying and actuating the same, parts being broken away and parts in section. Fig. 12 is a plan view of a portion of the rake head and a block thereon to which the rake bar is secured. Fig. 13 is a vertical section through the lower part of the means carried by the arm that actuates the rake bar. Fig. 14 is a vertical section on the line 14—14 of Fig. 11. Fig. 15 is a plan view of the rake bar actuating mechanism, parts being broken away and the rake bar at the raking position. Fig. 16 is the same at a different stage of the operation, the rake bar approaching the discharging position. Fig. 17 is a plan view of the fulcrum frame to which the rake bar is connected and the means for holding the rake in its elevated position during its return movement, the fulcrum post being in section. Fig. 18 is a perspective view of the cam plate which supports the rake bar in its return movement and the post to which it is secured, associated parts being partly broken away.

Referring now to the details of the invention shown by the figures herein shown 20 and 21 represent the outer and inner ground wheels of a mowing machine having a shaft 22. It also carries a frame 23 to which the tongue 24 is secured. A forwardly projecting frame is provided carrying the arm or portion 25 to the left hand end of which a shoe 26 and cutter bar 27 are pivoted in the usual manner. A knife 28 is driven by the pitman rod 29.

The foregoing parts are old parts of such machines and constitute no part of this invention or improvement, and this invention and improvement are in no manner limited to use in connection with any particular form or type of mowing machine. My invention pertains to the other parts which will be hereafter described and that are capable of being attached to or mounted in connection with any type of machine. In the first place a platform 30 is made for the machine having along the inner side an upwardly extending wheel guard 31 and along its outer boundary a guard 32 that prevents the hay or other material escaping from the platform to the rear thereof. This platform is so constructed that it is readily attachable to or detachable from any ordinary type of machine. Along the forward edge of said platform there is a stiff bar 33 secured with upper and lower projecting fingers 34 and 35 at intervals which are adapted to engage the upper and under sides of the rear portion of the cutter bar so that the cutter bar may support the forward end of the platform. At the inner end of the forward portion of the platform there is a lateral projection 36 that extends into the upper part of the shoe 26. At the other end of the forward portion of the platform there is a removable lateral projection 37 that extends into an opening in the guard 38 at the outer end of the cutter bar. In this way it is possible to readily attach the platform to the cutter bar by loosening the projection 37 and inserting the projection 36 in place, then inserting the projection 37 in place and tightening up the screws 39, and said projections together with the bar 33 and fingers 34 and 35 will hold the platform in place. A bar 40 extends rearward from the middle portion of the bar 33 to a swivel wheel bracket 41 secured to the rear end of the platform 30 and guard 32 and which carries a swivel wheel 42. The guards 31 and 32 are arranged to leave the discharge portion of the platform at the side of the rear end of the platform and behind the main frame of the machine.

Two upwardly extending supports 45 and 245 are secured upon the tongue 24, as shown in Figs. 1 and 6, and to their upper ends one end of a frame or casting 46 is secured by bolts 47. The right hand end of this casting, as shown in Fig. 1, has a post 48, and, as seen in Fig. 10, the upper end of that post carries a fulcrum post 49 that is vertically extending and held in place by a screw 50. Upon this post 49 the rake bar is fulcrumed by the means shown in Figs. 10 and 17.
There a frame 52 has a recess or opening in it for a plate 53 that is secured to the post 49 and is pivoted by a pin 54 to said frame 52. The frame 52 has secured to it by rivets 55 one end 56 of what may be called the rake bar. This end 56 is a round rod bent into an irregular form, as appears in Figs. 1 and 6. At its outer end it is supplemented by two bars 57 that constitute the outer end of the rake bar. These bars 57 are centrally spread apart and held by the brace 58 for the purpose of stiffening said bars. The outer bars 57 of the rake bar are secured to the inner end of the bar 56 by a pin 257 that extends through the bars 57 and one of a series of holes 258 in the widened outer end of bar 56, as seen in Fig. 15, whereby the union of the bars 56 and 57 may be adjusted, the brace rod 74 yielding for such purpose. The outer end of the rake bar is secured to a block 60 that in turn is fastened to the rake head 61 which has teeth 62. Said block has two series of holes 63 in the top of it through which the bolts 64 extend for fastening the rake bar to the rake. The two bolts 64 are placed in such holes 63 as will cause the rake to assume the right angular position with reference to the rake bar and front of the platform. Likewise the rake head has a series of holes 65 through which bolts 66 extend for securing the block 60 in position so that the rake will occupy the right position horizontally on the platform. The outer end of the rake is made extensible by a tooth 70 that is on a bar 71 slidably mounted on the rake head under straps 72 and held in position by a set-screw 73. The rake bar is braced and the position of the rake bar adjusted and held in the desired position with reference to a horizontal line by a rod 74 which is pivoted on the upper end of the fulcrum post 49 and extends through an arm 75 that is secured to the rake bar about midway and at its lower end is fastened in one of a series of holes 76 in a bar 77 that is secured to the rake head 71 and extends upward therefrom, as shown in Fig. 1. By altering the connection between said rod 74 and bars 77 the pitch of the rake may be altered. The weight of the rake is nearly counter-balanced by the pull of a spring 78 on the heel 79 of the rake bar 56. Said spring is fastened at its lower end in an eye 80 on the lower part of the post 48. At its upper end the spring is fastened to a screw 81 that is adjustably mounted in the heel piece 79, whereby the tension of the spring 78 may be modified.

The casting or frame 46 is supported and held in position not only by the frame pieces 45 and 245 but by the upwardly extending arm 82 that is mounted on the frame 23 and also by a brace rod 84 that engages the eye 80 and extends through the head on the rod 85, where said rod 84 is threaded and has a nut 86. The lower end of the rod 85 is secured to the frame of the machine so that said bracing means may be tightened or adjusted to hold the frame 46 in place.

In the left hand end of the frame 46 there is mounted a horizontally disposed shaft 90 which has secured on its outer end a ratchet wheel 91 adjacent a sprocket wheel 92 that rides loosely on the shaft 90 and is held against the ratchet wheel by the washer 93. It is driven by a sprocket chain 94 that is driven by a sprocket wheel 95 secured by bolts 96 to the plate or disk 97, seen in Figs. 1, 2 and 3, which has about three arms 98 that project from it having heads or plates 99 provided with a pair of holes through which the ends of a U-shaped clamp 100 extend and which are tightened by nuts 101 so as to clamp said plates 99 to the spokes 102 of the wheel 21. This pinion 95 and plate 97 are secured at the end of the main shaft or axle of the machine that is next to the platform and they are co-axial with said shaft, so that the revolution of the wheel 21 drives, through the mechanism just described, the rake operating shaft 90. Said shaft 90 carries at its right hand end as it appears in Fig. 1 a vertical bevel gear 103 which meshes with a horizontal gear 104 keyed to a vertical shaft 106, as seen in Fig. 14, that at its lower end is mounted in the left hand portion of the casting 46 and near its middle is mounted in an upward looped portion 105 of said casting 46, that appears in Fig. 11, and on the upper end of said shaft is secured a rake actuating arm 107. The bevel gear 103 is loosely mounted on the shaft 90 but is clutched into engagement with said shaft by the stationary clutch member 108 connected with said wheel 103 and the sliding clutch member 109 that is splined on said shaft. This sliding clutch member is actuated by a rearwardly extending hand lever 110, seen in Fig. 7, which is fulcrumed at 111 to the arm 112. Said lever 110 is crooked as shown in Fig. 7 and has a slot through which the pin 113 loosely extends. The lever is set in position by a spring pawl 114 engaging the rack bar 215. This Fig. 7 is a rear view of that portion of Fig. 11 that is to the right of the clutch member 108.

Further considering the rake actuating mechanism, appearing in Figs. 11, 13 and 15 to 18, it is observed that the arm 107 carries at its outer end a removable rotatable block 115 that is held by screws 116 and said block has a pair of upwardly extending rods 117 parallel with each other and connected at their tops by a bar 118. Each of these rods carries a roller 119 having a concave periphery so that they will hold between them the round rake bar 56; and said pairs of rollers 119 slide up and down on rods 117 and travel back and forth against said rake bar 56 as the latter is operated. By the means just described the rake is moved backward from the cutter bar along the platform to the discharging end thereof, and after it has been elevated somewhat it is returned by the same means and lowered to the forward portion of the platform to engage another bunch of clover or other material being cut. In this operation of the rake bar it is necessary that the rake at its rearward end be elevated for the return movement thereof and that is accomplished by the following mechanism. An irregularly shaped track frame consisting of the middle portion or bar 120 and the end or track portions 121 and 122 is so mounted as to rock, as shown by the full and dotted lines in Fig. 6. The middle portion is substantially horizontal, while the portions 121 and 122 are elevated and inclined as shown in Fig. 6 in full lines. During the first part of the rearward movement of the rake a roller 125 on an arm 126 that is connected with the arm 107 and fulcrumed and keyed to the shaft 106 travels over the horizontal bar 120 from the right to the left as shown in Fig. 6. As the rake reaches the lower part of its movement, the rake bar 56 rides upon the inclined portion 122 of the track, as appears in Fig. 6. When the rake reaches the latter part of its raking movement and the rake bar is still on the arm 122, as seen in Fig. 6, the rake is suddenly elevated to the dotted line position shown in Fig. 6. The roller 125 engages the lower part of the inclined arm 121 and the further movement of said roller and rake cause the roller to force said arm down into its dotted line position shown in Fig. 6, which tips the other end of said track frame, elevating the arm or portion 122 and thus elevating the rake. This movement of the rake kicks or discharges the bunch from the platform. When the rake bar is in its elevated position thus given it, as shown in Fig. 6, a roller 130 is elevated to the dotted line position there shown so that it will ride upon the plate or track 131 and maintain the rake in its elevated position while the rake is returning to the front end of the platform. The roller 130 extends inwardly from the upper end of a vertical bar 132 and the outer end of an arm 133 that extends from and is integral with the frame or piece 52 that carries the rake bar, as seen in Fig. 17, and which is fulcrumed on the post 49. A plate or track 131 is secured stationary on the post 49 as seen in Fig. 18 and its outer end is curved and provided with an elevated track as shown in that figure. The plate 131 is braced by the bar 232 that is secured under it to the post 49, for the plate 131 is subjected to considerable strain as it supports the rake bar and rake during the return movement of the latter. After the rake has discharged a bunch and reached its elevated position shown by dotted lines in Fig. 6, it is returned while elevated by the further movement of the arm 107. During the further movement of the roller 125 on the arm 126 and after it leaves the inclined arm or portion 121 of said track frame, the latter is still held in its tilted position by a bent arm 135 that is secured to the arm 126 as seen in Fig. 15 continuing to ride or bear down upon a projection 136 from the end of the portion 121 of the track frame. This arm 135 rides upon the projection 136 of the track frame and holds down that end of said frame until the outer end of the arm 107 has passed the end 136 of the tilting frame so that such end of the frame cannot fly up, as the roller 125 escapes into the path of the end of the arm 107. The spring 147 returns the rocking arm to normal position. This completes the movement of the rake bar and is repeated in the subsequent movements thereof. When it is desired to stop the rake to permit a thin growth of clover to accumulate a sufficient bunch on the platform, the lever 110 is operated. It is thrown in gear when a bunch of sufficient size has accumulated.

What I claim as my invention and desire to secure by Letters Patent is:

1. A raking attachment for mowing machines and the like that includes a vertical post, a rake with a rake bar fulcrumed to said post so as to be horizontally and vertically oscillatory, means for oscillating said rake bar horizontally, a plate secured to said post, and means connected with said rake bar that is adapted to travel on said plate and support the rake bar in an elevated position during the return movement of the rake.

2. A raking attachment for mowing machines and the like that includes a vertical post, a rake with a rake bar fulcrumed to said post between the ends of the rake bar so as to be horizontally and vertically oscillatory, a spring acting on one end of said rake bar that tends to balance the raking movement.

3. A raking attachment for mowing machines and the like that includes a vertical post, a rake with a rake bar fulcrumed to said post so as to be horizontally and vertically oscillatory, means for oscillating said rake bar horizontally, a plate secured to said post, means connected with said rake bar that is adapted to travel on said plate and support the rake bar in an elevated position during the return movement of the rake, and means for elevating said rake bar at the end of the raking movement so that said traveling means may travel upon said plate.

4. A raking attachment for mowing machines and the like that includes a vertical post, a rake with a rake bar fulcrumed to said post so as to be horizontally and vertically oscillatory, a horizontally revolving means between said post and rake that engages and gives to said rake bar its oscillatory movement, and means for supporting the rake bar in an elevated position during the return movement of the rake.

5. A raking attachment for mowing machines and the like that includes a vertical post, a rake with a round rake bar that is fulcrumed to said post so as to be both horizontally and vertically oscillatory, a horizontally revoluble arm, a pair of vertical rods extending upward from the end of said arm, one on each side of said rake bar, and rollers on said vertical rods that embrace said rake bar and are vertically slidable on said rods.

6. A raking attachment for mowing machines and the like that includes a vertical post, a rake with a rake bar fulcrumed to said post so as to be horizontally and vertically oscillatory, means for horizontally oscillating said rake bar, a rocking frame adapted to engage said rake bar during the latter part of the raking movement, and means movable with said rake bar actuating means that rocks said rocking frame in the latter part of the raking movement so it will elevate the rake bar.

7. A raking attachment for mowing machines and the like that includes a vertical post, a rake with a rake bar fulcrumed to said post so as to be both horizontally and vertically oscillatory, a horizontally revoluble crank, means carried by said crank for engaging the rake bar and horizontally oscillating it, a rocking frame formed at one end with a portion that is adapted to engage said rake bar near the end of the raking movement, and an arm connected to and movable with said crank which arm engages the other end of said frame and rocks the same near the end of the raking movement, whereby the rake is elevated.

8. A raking attachment for mowing machines and the like that includes a vertical post, a rake with a rake bar fulcrumed to said post so as to be both horizontally and vertically oscillatory, a horizontally revoluble crank, means carried by said crank for engaging the rake bar and horizontally oscillating it, a rocking frame formed at one end with a portion that is adapted to engage said rake bar near the end of the raking movement, an arm connected to and movable with said crank which arm engages the other end of said frame and rocks the same near the end of the raking movement, whereby the rake is elevated and a bar connected with said raking bar that holds said rocking frame in its rocked position for some time after said rocking arm has left said rocking frame.

9. A raking attachment for mowing machines and the like that includes a rake with a rake bar formed of a fulcrumed portion and a portion secured to the rake and pivotally mounted in connection with said fulcrumed portion, whereby the position of the rake at its forward limit of movement may be set.

10. A raking attachment for mowing machines and the like that includes a vertical post, a rake with a rake bar pivoted to said post, said rake bar being formed of two parts or ends and adjustable connections between said parts whereby their angular relation may be changed near the middle of the rake bar, a brace rod extending from said post to the rake, and an arm connected with the rake bar near its middle which arm is connected with said brace rod.

11. A raking attachment for mowing machines and the like that includes a rake with a pair of straps near one end, a bar slidably mounted on said rake within said straps, and a set-screw for clamping the bar in position.

12. A raking attachment for mowing machines and the like that includes a rake, a rake bar, and means for connecting the two that is adjustable on the rake, whereby the position of the rake may be adjusted.

13. A raking attachment for mowing machines and the like that includes a rake, a rake bar, and means for connecting the rake bar with the rake that permits horizontal adjustment of the rake.

14. A raking attachment for mowing machines and the like that includes a rake, a rake bar connected therewith, a brace rod, and means for adjustably connecting the brace rod with the rake at a point away from the connection of the rake bar and the rake, whereby the rake may be adjusted and tilted vertically.

15. A raking attachment for mowing machines and the like that includes a cutter bar, a platform with a laterally extending projection at each end of the forward end of the platform and means connected with said cutter bar into which said projections may extend.

In witness whereof, I have hereunto affixed my signature in the presence of the witnesses herein named.

NELSON G. HANNA.

Witnesses:
EFFIE REIFF,
THEODORE M. CONNER.